(No Model.)
L. ROSSITER.
Vehicle Wheel Hubs.
No. 228,940.        Patented June 15, 1880.
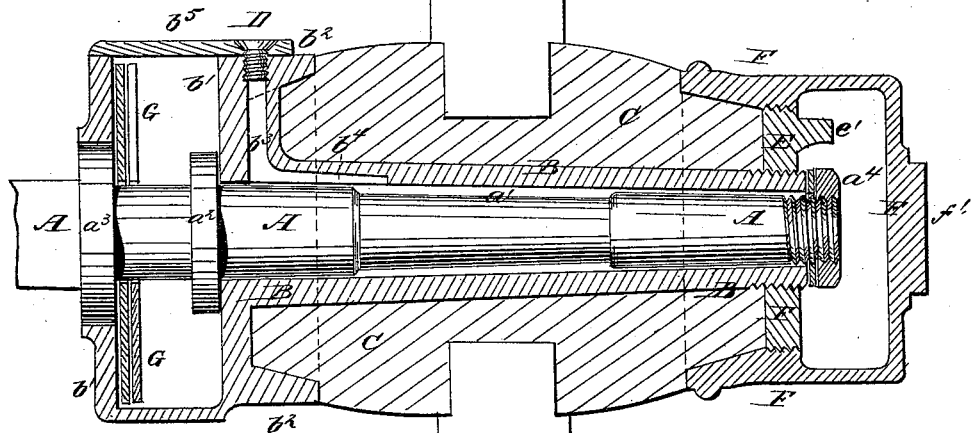
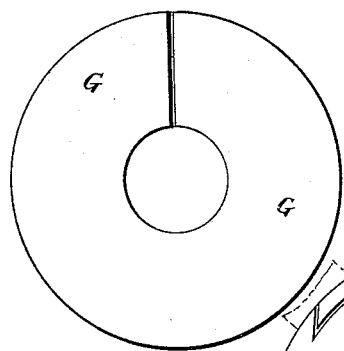
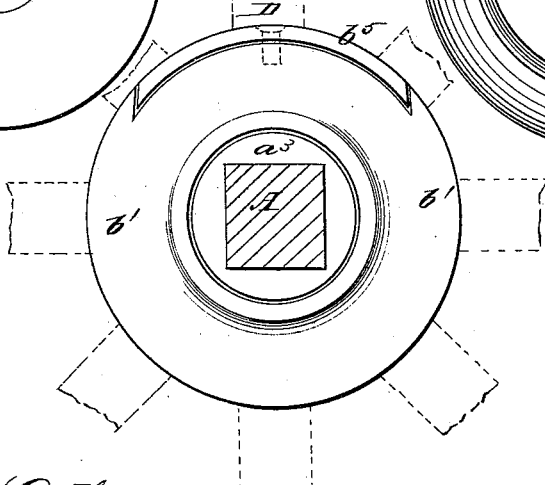
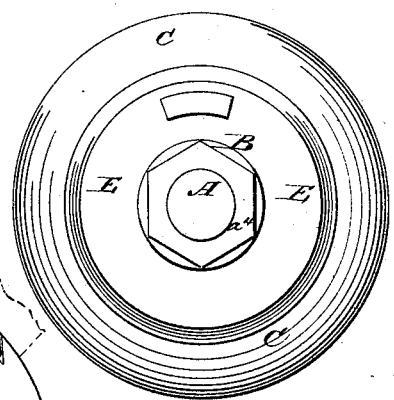
WITNESSES:
Francis McArdle.
C. Sedgwick.
INVENTOR:
L. Rossiter
BY Munn &Co.
ATTORNEYS.

UNITED STATES PATENT OFFICE.

LINDSEY ROSSITER, OF PORT CARBON, (BRIDGEPORT P. O.,) ASSIGNOR TO HIMSELF AND NATHAN M. ANDERSON, OF UPPER MERION, PA.

VEHICLE-WHEEL HUB.

SPECIFICATION forming part of Letters Patent No. 228,940, dated June 15, 1880.

Application filed March 5, 1880. (No model.)

*To all whom it may concern:*

Be it known that I, LINDSEY ROSSITER, of Port Carbon, (Bridgeport P. O.,) in the county of Schuylkill and State of Pennsylvania, have invented a new and useful Improvement in Axles, Axle-Boxes, and Hubs, of which the following is a specification.

Figure 1 is a longitudinal section of my improved axle-box and hub, the axle being shown in side view. Fig. 2 is a view of the rear end of the same, the axle being shown in cross-section. Fig. 3 is a detail view of the leather washer. Fig. 4 is a view of the forward end of the axle, axle-box, and hub, the cap being removed.

The object of this invention is to improve the construction of axles, axle-boxes, and hubs, so that they may be conveniently oiled, will not leak or waste oil, and will run a long distance without oiling.

Similar letters of reference indicate corresponding parts.

A represents the axle, the middle part of which is turned down to form a wide shallow groove or oil-chamber, $a'$. Upon the rear part of the axle A are formed two collars, $a^2$ $a^3$, at a little distance apart, and the forward one of which rests against the rear end of the axle-box B. Upon the forward end of the axle A is formed a screw-thread to receive the axle-nut $a^4$, which rests against the forward end of the axle-box B. Upon the rear end of the axle-box B is formed a ring-chamber, $b'$, through which the axle A passes, and the rear side of which has a hole formed through it to receive and fit upon the rear collar, $a^3$, of the axle A.

Upon the forward side of the chamber $b'$ is formed a flange, $b^2$, to fit upon the rear end of the hub C and serve as a hub-band. The inner surface of the band-flange $b^2$ is flared, and the rear end of the hub C is correspondingly tapered, so that the said flange may fit snugly upon the said hub. Upon the forward side of the chamber $b'$ is formed a tube or passage, $b^3$, which passes in through the rear end of the hub C, and with the inner end of which is connected a groove, $b^4$, which extends longitudinally along the inner surface of the axle-box B and connects with the wide groove or oil-chamber $a'$ in the axle A.

In one side of the chamber $b'$ is formed an opening, which is closed by a slide-plate, $b^5$. The side edges of the plate $b^5$ are dovetailed to the wall of the chamber $b'$ at the sides of its opening, as shown in Fig. 2. The plate $b^5$ is secured in place by a screw, D, which passes through its forward part and screws into a screw-thread in the outer end of the tube or passage $b^3$, so as to serve as a screw-plug for the said tube or passage.

The forward end of the axle-box B projects at the forward end of the hub C, and has a screw-thread cut upon it, into which fits the screw-thread cut in the inner edge of the ring-plate E, which rests against the forward end of the hub C.

The outer edge of the ring-plate E has a screw-thread cut upon it to receive a screw-thread cut in the middle part of the inner surface of the cap F. The inner surface of the cap F, between its screw-thread and edge, is flared to receive the forward end of the hub C and serve as a hub-band, the said forward end of the hub C being tapered correspondingly.

The cap F forms a chamber to receive any oil that may work out around the forward end of the axle A, and allow it to work back when needed.

Upon the outer surface of the ring-plate E is formed a projection, $e'$, so that by striking upon the said projection with a hammer the said ring-plate may be tightened or loosened, as required.

The chamber $b'$ is designed to receive wick or other packing, to absorb any oil that may work out around the collar $a^2$, and prevent it from wasting, and also to keep the axle A from heating.

The joint between the collar $a^3$ and the rear wall of the chamber $b'$ is covered by one or more leather washers, G, placed upon the axle A, and which keep the packing and oil from working out and dust from working in through the said joint.

The leather washers G are slitted, as shown in Fig. 3, so that they may be put in and taken out through the opening in the side wall of the chamber $b'$.

Upon the outer end of the cap F is formed a square projection, $f'$, to receive a wrench for screwing the said cap F on and off.

Having thus fully described my invention, I claim as new and desire to secure by Letters Patent—

The combination of the axle A, having groove $a'$, collars $a^2$ $a^3$, and nut $a^4$, the end-threaded axle-box B, having chamber $b'$, flange $b^2$, passage $b^3$, and groove $b^4$, the wooden hub C, the ring-plate E, threaded on outer and inner edges and the cap F, as shown and described.

LINDSEY ROSSITER.

Witnesses:
CHARLES MULLIN,
ISAAC R. FISHER.